US011849398B2

(12) United States Patent
Sevin et al.

(10) Patent No.: US 11,849,398 B2
(45) Date of Patent: *Dec. 19, 2023

(54) COMMUNICATION METHODS AND DEVICES

(71) Applicant: CANON KABUSHIKI KAISHA, Tokyo (JP)

(72) Inventors: Julien Sevin, Saint Aubin du Cormier (FR); Stéphane Baron, Le Rheu (FR); Pascal Viger, Janze (FR); Patrice Nezou, Liffre (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/050,276

(22) Filed: Oct. 27, 2022

(65) Prior Publication Data
US 2023/0071156 A1 Mar. 9, 2023

Related U.S. Application Data

(63) Continuation of application No. 17/051,111, filed as application No. PCT/EP2019/060537 on Apr. 24, 2019, now Pat. No. 11,516,739.

(30) Foreign Application Priority Data

May 4, 2018 (GB) .................................. 1807393

(51) Int. Cl.
H04W 52/02 (2009.01)
H04W 84/12 (2009.01)
H04W 84/02 (2009.01)

(52) U.S. Cl.
CPC ... *H04W 52/0235* (2013.01); *H04W 52/0219* (2013.01); *H04W 52/0229* (2013.01); *H04W 84/02* (2013.01); *Y02D 30/70* (2020.08)

(58) Field of Classification Search
CPC ......... H04W 52/0235; H04W 52/0219; H04W 52/0229; H04W 84/12; Y02D 30/70
See application file for complete search history.

(56) References Cited

U.S. PATENT DOCUMENTS 11,516,739 B2 * 11/2022 Sevin ................ H04W 52/0219
2015/0208349 A1    7/2015 Ramamurthy et al.
(Continued)

FOREIGN PATENT DOCUMENTS

CN    107659984 A    2/2018
CN    107969028 A    4/2018
(Continued)

OTHER PUBLICATIONS

Huawei Technologies Co., Ltd., HiSilicon Technologies Co., Ltd.; "NB-CIoT—Proposed Conclusion for the Cellular IoT SI (revision of GP-150740)"; GP-150905; 3GPP TSG GERAN#67; pp. 1-7.

Primary Examiner — Mohammad S Anwar
(74) Attorney, Agent, or Firm — Canon U.S.A., Inc. IP Division

(57) ABSTRACT

The present invention provides a communication method in a wireless communication network comprising at least one network cell (BSS), each cell comprising at least one station (non-AP) managed by an access point (AP), the method comprising, at the access point:
transmitting a Wake-Up radio (WUR) frame to at least one station of the network cell of the access point;
transmitting a primary channel radio (PCR) frame including update information, the PCR frame being transmitted to said at least one station of the network cell of the access point.

12 Claims, 10 Drawing Sheets

(56) References Cited

U.S. PATENT DOCUMENTS

2018/0020404 A1     1/2018   Huang et al.
2018/0084501 A1     3/2018   Ramamurthy et al.

FOREIGN PATENT DOCUMENTS

| CN | 107979443 A | 5/2018 | |
|---|---|---|---|
| JP | 2015136113 A | 7/2015 | |
| WO | 2017164687 A1 | 9/2017 | |
| WO | WO-2018237180 A1 * | 12/2018 | ......... H04L 63/0846 |

* cited by examiner

| Type | Type description |
|---|---|
| 0 | WUR Beacon |
| 1 | WUR Wake Up |
| 2 | WUR Vendor Specific |
| 3 | WUR Discovery |
| 4 | WUR Broadcast Identifiers Modification |
| 5 | WUR unicast Identifiers Modification |
| 6-TBD | Reserved |

Action Type definitions

| Action Type value | Meaning |
|---|---|
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6 | WUR identifiers collision identification |
| 7 | Wake Up ID collision identification |
| 8 | Transmit ID collision identification |
| 9 | Group ID collision identification |
| 10 | WUR identifiers collision identification response |
| 11-255 | Reserved |

Subfields of WUR Parameters field from AP

Figure 5c

| Subfield | Meaning |
|---|---|
| WUR ID | A WUR identifier that uniquely identifies the WUR STA within the BSS of the AP |
| Duty cycle information | TBD |
| Transmit ID | New Transmit ID to be applied |
| Hash Identifier | New identifier of a predetermined WUR identifiers hash function to be applied |
| Wake-Up ID | New Wake-Up ID to be applied |
| Group ID | New Group ID to be applied |

581 — WUR ID
582 — Duty cycle information
583 — Transmit ID
584 — Hash Identifier
585 — Wake-Up ID
586 — Group ID
587

Subfields of WUR Parameters field from AP

Figure 5

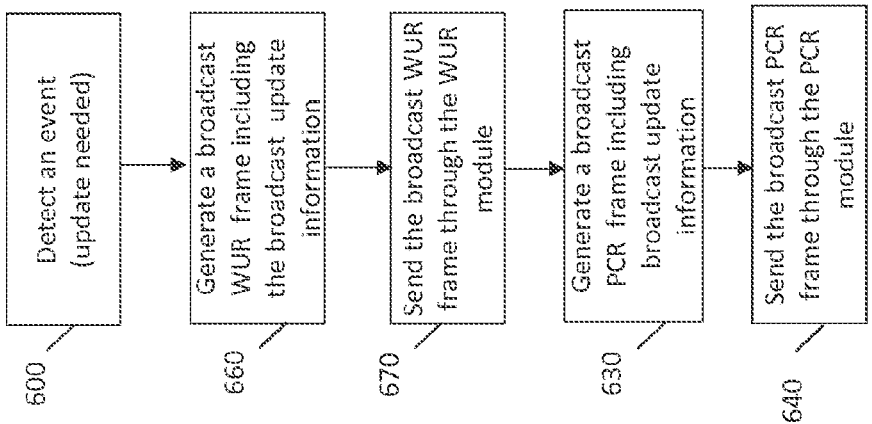
Figure 6b
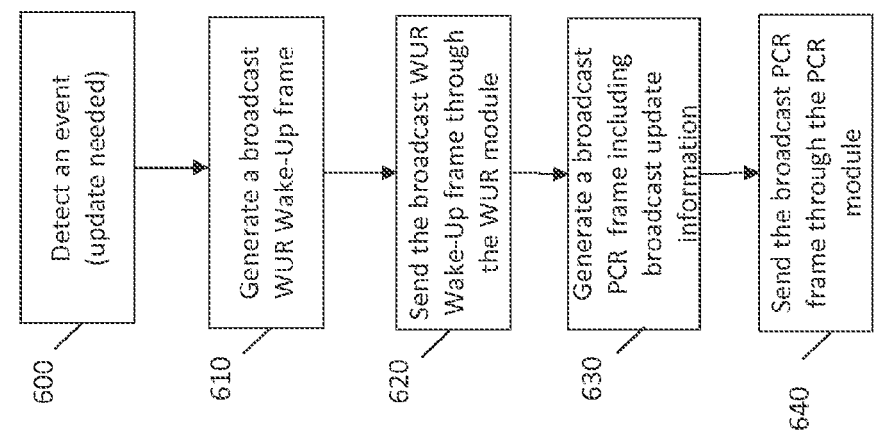
Figure 6a
Figure 6

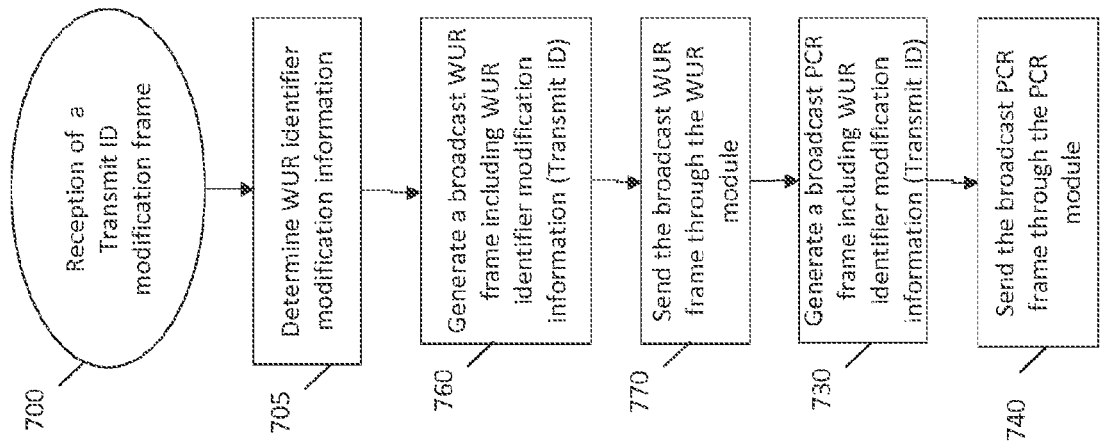
Figure 7b
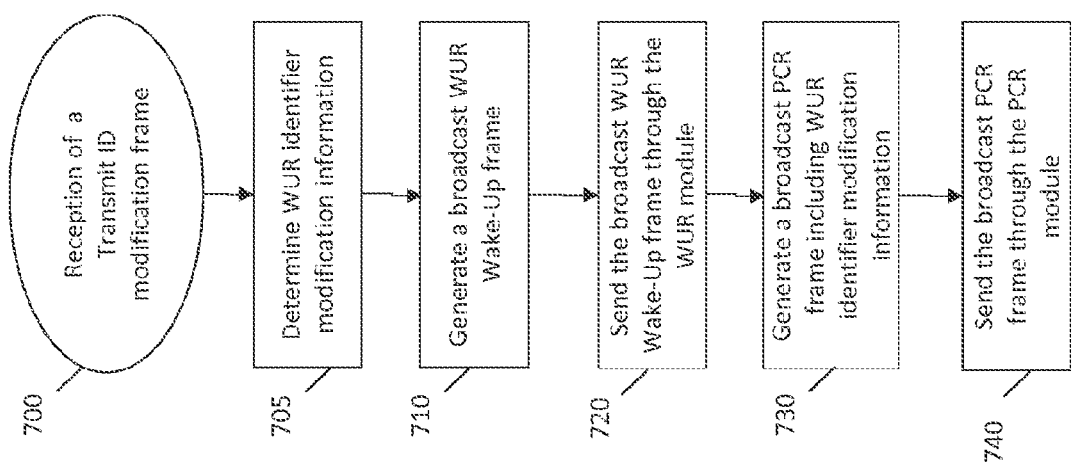
Figure 7a
Figure 7

COMMUNICATION METHODS AND DEVICES

CROSS-REFERENCE TO RELATED APPLICATIONS

This application is a continuation of U.S. patent application Ser. No. 17/051,111, filed on Oct. 27, 2020, which is a national phase application of international patent application PCT/EP2019/060537 filed on Apr. 24, 2019, and claims the benefit under 35 U.S.C. § 119(a)-(d) of United Kingdom Patent Application No. 1807393.2 filed May 4, 2018, which applications are hereby incorporated by reference herein in their entireties.

FIELD OF THE INVENTION

The present invention relates generally to communication networks and more specifically to methods and systems for communicating in a wireless communication network comprising at least one network cell (BSS), each cell comprising at least one station (non-AP) managed by an access point (AP).

The invention finds application in particular in 802.11ba networks.

BACKGROUND OF THE INVENTION

In recent years, the number of battery-powered devices has increased strongly with cellular telephones, tablets, laptop computers, wearable devices, Internet of Things (IoT) devices and so on. Consequently, nowadays, a key consideration in wireless system design is the optimal use of the power consumption.

In such a context, the IEEE 802.11 standard organization has launched a new task group, IEEE 802.11ba, in which the definition of an ultra-low power consumption Wake-Up Radio (WUR) module is studied.

A wireless device comprising a radio module compliant with the IEEE 802.11a/b/n/ac/ax standards, referred to as a PCR and coupled with a WUR module is considered. The objective of the WUR module is to wake up the PCR on-demand, only when it is necessary (e.g., only when there are data to transmit). In this way, the PCR can enter more frequently in doze mode; hence, the power consumption is reduced. The power consumption requirements related to WUR module are very strong with an objective of drawing less than 100 microwatts when it is awake. Depending on the implementation, the WUR module may be always awake or awake only when PCR is in doze mode.

During the system operation, the AP may need to send update information to its associated non-AP stations. In a first case (referred to as broadcast case), the update information may concern all its associated non-AP stations or a group of its associated non-AP stations. In a second case (referred to as unicast case), the update information may concern only one station. Moreover, the update information may either be used to update value(s) relative to WUR parameter(s) and/or relative to PCR parameter(s).

In the broadcast case, a problem is that some non-AP stations may have their PCR module awake, while others may have their PCR module in doze mode. However, the update information is sent to all non-AP stations (or all non-AP stations of the group). Hence, it is restrictive, in terms of latency, to wait for the Wake-Up (for an update information directed to the PCR module) or the sleeping (for an update information directed to the WUR module) of all non-AP stations to apply the update information.

Similarly, in the unicast case, the targeted non-AP station may have a PCR module either awake or in doze mode, and the update information may concern either the PCR module or the WUR module. Hence, it is also restrictive, in terms of latency, to wait for the Wake-Up (i.e. for an update information directed to the PCR module) or the sleeping (for an update information directed to the WUR module) of the targeted non-AP station to apply the update information.

There is thus a need to improve existing communication methods between an AP and non-AP stations comprising a PCR module and WUR module.

SUMMARY OF INVENTION

The present invention has been devised to address one or more of the foregoing concerns.

In this context, according to a first aspect of the invention, there is provided a communication method in a wireless communication network comprising at least one network cell (BSS), each cell comprising at least one station (non-AP) managed by an access point (AP), the method comprising, at the access point:
transmitting a Wake-Up radio (WUR) frame to at least one station of the network cell of the access point;
transmitting a primary channel radio (PCR) frame including update information, the PCR frame being transmitted to said at least one station of the network cell of the access point.

Therefore, the update information may be applied to all the station with no latency, no matter their PCR module/WUR module are awake or in doze mode.

Correspondingly, there is provided an access point in a wireless communication network comprising at least one network cell (BSS), each cell comprising at least one station (non-AP) managed by an access point (AP), the access point comprising at least one microprocessor configured for carrying out the following steps:
transmitting a Wake-Up Radio (WUR) frame to at least one station of the network cell of the access point;
transmitting a primary channel radio (PCR) frame including update information, the PCR frame being transmitted to at least one station of the network cell of the access point.

The access point has the same advantages as the method according to the first aspect defined above.

Optional features of the invention are further defined in the dependent appended claims. Some of these features are explained here below with reference to a method, while they can be transposed into device features dedicated to any access point according to the invention.

According to embodiments, the PCR frame is a PCR broadcast frame transmitted to all the stations of the network cell of the access point that are awake.

According to embodiments, the WUR frame is a WUR broadcast frame for waking-up all the stations of the network cell of the access point that are in doze mode.

According to embodiments, the WUR frame includes said update information and is sent to all the stations of the network cell of the access point that are in doze mode without waking-up them.

According to embodiments, transmitting a Wake-Up Radio (WUR) frame is performed upon detection of at least one event among the following events:
reception of a user request to receive said update information;

reception of a message from a station of the network cell;
network change, degradation of the quality of service, or arrival of a new station in the network cell.

According to embodiments, the message from a station of the network cell is an Action Frame with a field Action Type indicating that a collision occurred.

According to embodiments, the message from a station of the network cell is an Action Frame with a field Action Type indicating that a collision occurred between Wake-Up ID identifiers, Group ID identifiers or Transmit ID identifiers.

According to embodiments, the update information includes WUR identifier modification information.

According to embodiments, the WUR identifier modification information is a new WUR identifier.

According to embodiments, the new WUR identifier is a Wake-Up ID, a Group ID or a Transmit ID.

According to embodiments, the WUR identifier modification information is an identifier of a hash function to be applied to compute a frame check sequence (FCS) of a WUR frame. For instance, the hash function may be based on the 12 first (or last) bits of the BSSID of the AP. It may be also based on XOR.

According to embodiments, the update information includes a new value of a WUR parameter among the following ones: Minimum Wake-Up Duration, a period for which the station is able to receive WUR frames, available frequency bands and channels that can be used for transmission of a WUR frame from the access-point to the station, a WUR Channel or a WUR Beacon.

According to embodiments, the update information includes a new value for a given WLAN parameter among the following ones: width of High Throughput operation channel, channel frequency, acknowledgment policy, quality of service parameters, Modulation and Coding Scheme (MCS), RTS Threshold, Short Retry Limit, OCWmin, or the Number of trigger frames per TBTT.

According to a second aspect of the invention, there is provided a communication method in a wireless communication network at least one network cell (BSS), each cell comprising at least one station (non-AP) managed by an access point (AP), the method comprising, at the access point:
  determining whether a given station is in doze mode or awake; and
  if the given station is in doze mode, transmitting a Wake-Up Radio (WUR) unicast frame to the given station and update information;
  if the given station is awake, transmitting a PCR unicast frame to the given station, wherein the PCR unicast frame includes said update information.

Therefore, the update information may be applied to the targeted station with no latency, no matter if its PCR module/WUR module is awake or in doze mode.

Correspondingly, there is provided an access point (AP) in a wireless communication network comprising at least one network cell (BSS), each cell comprising at least one station (non-AP) managed by an access point (AP), the access point comprising at least one microprocessor configured for carrying out the following steps:
  determining whether a given station is in doze mode or awake; and
  if the given station is in doze mode, transmitting a Wake-Up Radio (WUR) unicast frame to the given station and update information;
  if the given station is awake, transmitting a PCR unicast frame to the given station, wherein the PCR unicast frame includes said update information.

The an access point has the same advantages as the method according to the second aspect defined above.

Optional features of the invention are further defined in the dependent appended claims. Some of these features are explained here below with reference to a method, while they can be transposed into device features dedicated to an access point according to the invention.

According to embodiments, the WUR unicast frame includes said update information.

According to embodiments, the WUR unicast frame is a WUR unicast Wake-Up frame for waking up the given station and the method further comprises transmitting a PCR unicast frame to the given station, wherein the PCR unicast frame includes said update information.

According to embodiments, determining whether a given station is in doze mode or awake is performed upon detection of at least one event among the following events:
  reception of a user request to receive said update information;
  reception of a message from a station of the network cell;
  network change, degradation of the quality of service, or arrival of a new station in the network cell.

According to embodiments, the message from a station of the network cell is an Action Frame with a field Action Type indicating that a collision occurred.

According to embodiments, the message from a station of the network cell is an Action Frame with a field Action Type indicating that a collision occurred between Wake-Up ID identifiers, Group ID identifiers or Transmit ID identifiers.

According to embodiments, the update information includes WUR identifier modification information.

According to embodiments, the WUR identifier modification information is a new WUR identifier.

According to embodiments, the new WUR identifier is a Wake-Up ID, a Group ID or a Transmit ID.

According to embodiments, the WUR identifier modification information is an identifier of a hash function to be applied to compute a frame check sequence (FCS) of a WUR frame. For instance, the hash function may be based on the 12 first (or last) bits of the BSSID of the AP. It may be also based on XOR.

According to embodiments, the update information includes a new value of a WUR parameter among the following ones: Minimum Wake-Up Duration, a period for which the station is able to receive WUR frames, available frequency bands and channels that can be used for transmission of a WUR frame from the access-point to the station, a WUR Channel or a WUR Beacon.

According to embodiments, the update information includes a new value for a given WLAN parameter among the following ones: width of High Throughput operation channel, channel frequency, acknowledgment policy, quality of service parameters, Modulation and Coding Scheme (MCS), RTS Threshold, Short Retry Limit, OCWmin, or the Number of trigger frames per TBTT.

According to a third aspect of the invention, there is a provided wireless communication network comprising at least one communication device station and an access point as aforementioned.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5 including FIGS. 5a, 5b and 5c, shows fields/subfields/values added to the WUR frame and 802.11 MAC Action frame (including a WUR Action field) formats shown in FIGS. 3 and 4, according to embodiments of the invention;

FIG. 6 including FIGS. 6a and 6b, illustrates, using flowcharts, steps of communication methods during which broadcast update information is signaled by an AP to the non-AP stations of its network cell according to embodiments of the invention;

FIG. 7 including FIGS. 7a and 7b, illustrates, using flowcharts, steps of communication methods during which a WUR identifier (Transmit ID) modification is signaled by an AP to the non-AP stations of its network cell according to embodiments of the invention;

FIG. 8b illustrates, using a flowchart, steps of a communication method during which update information is signaled by an AP to a given non-AP station according to a variant of FIG. 8a;

DETAILED DESCRIPTION

In the following description, all the items referred to by the same numeral reference are identical.

Figure 1:
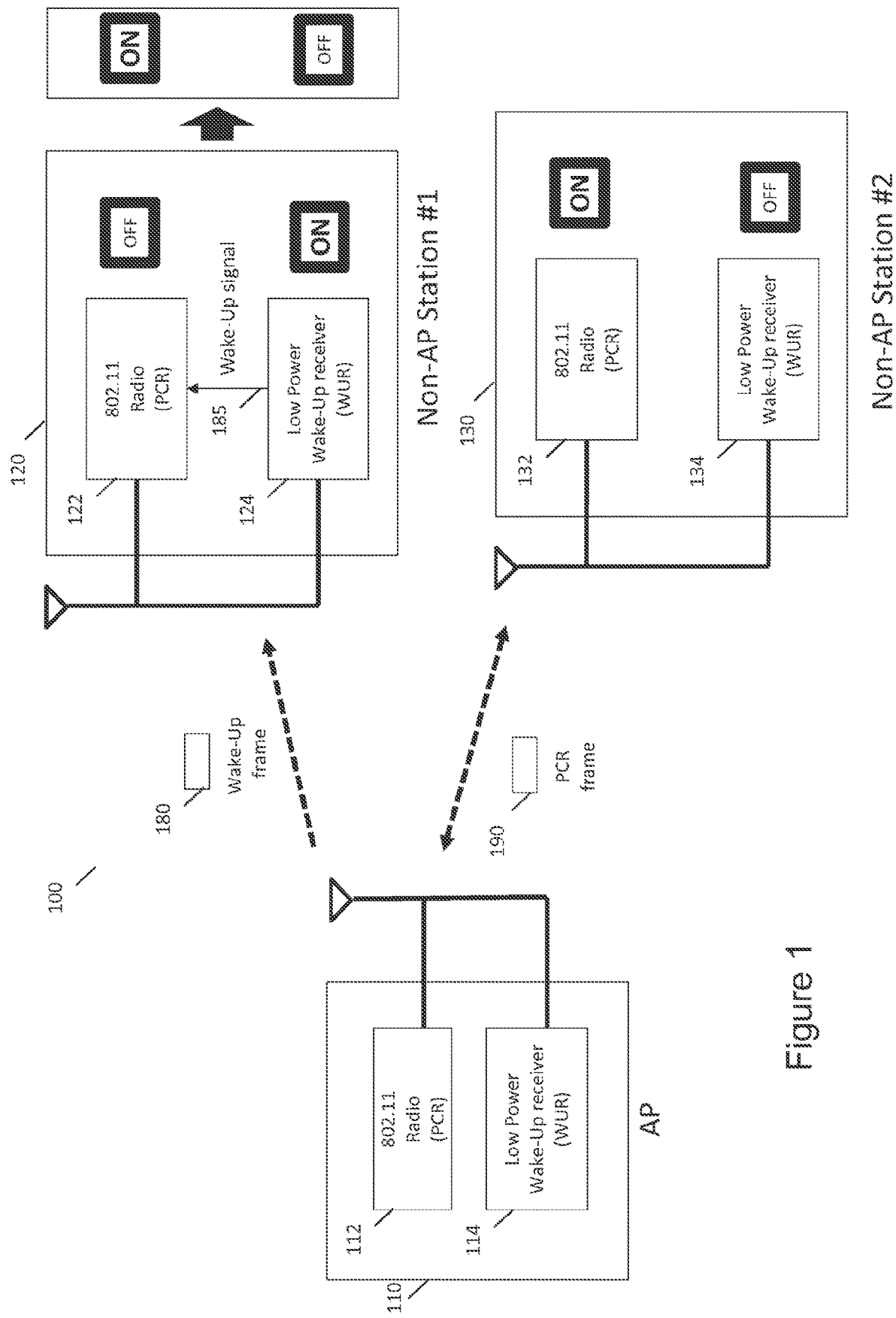
FIG. 1 illustrates a wireless communication system in which embodiments of the invention may be implemented.

FIG. 1 illustrates a wireless communication system in which embodiments of the invention may be implemented. Wireless communication system 100 includes three wireless devices, an Access Point (AP) 110 and two non-AP stations 120 and 130. Each device comprises two wireless communication modules. A first one, referred to as the primary connectivity radio (PCR), corresponds to the main radio thought which wireless data are exchanged. It may be compliant with IEEE 802.11 standard technology, for instance as defined in 802.11a/b/n/ac/ax standards. A second one, referred to as Wake-Up Radio (WUR) or WUR module or Wake-Up receiver, corresponds to the companion radio of PCR. It is a low-power-consumption radio one objective of which is to wake up the PCR of a non-AP station only when the PCR has data to send or receive from another radio.

Correspondingly, the AP 110 includes a PCR 112 and a WUR 114, the non-AP station 120 includes a PCR 122 and a WUR 124 and the non-AP station 130 includes a PCR 132 and a WUR 134.

A wireless communication module is considered OFF or in doze mode when it is not able to receive and transmit data. Inversely, a wireless communication is considered ON (i.e. set to ON) or awake when it is able to receive and transmit data. Basically, in a non-AP station, when the PCR is OFF, the WUR is ON and inversely when the PCR is ON, the WUR is OFF. In an alternative embodiment, the WUR may be always ON.

A shown in FIG. 1, the non-AP station 120 has a PCR 122 OFF and a WUR 124 ON and the non-AP station 130 has a PCR 132 ON and a WUR 134 OFF. Consequently, the use of the WUR radio allows the power consumption of the non-AP station 120 to be reduced because its PCR is OFF.

As the PCR 132 is ON, the frames 190, referred to as PCR frames, may be exchanged between the PCR 112 of the AP 110 and the PCR 132 of the non-AP station 130 as during a typical wireless IEE 802.11 transmission session. Such PCR frames 190 are not received by the PCR 122 of the non-AP station 120 because this one is OFF.

When the AP 110 has PCR data to send to the non-AP station 120, it needs to wake up the PCR 122. To do so, it uses its WUR 114 to transmit a frame 180, referred to as a WUR frame. A WUR frame consists of a legacy IEEE 802.11 preamble and a payload modulated by a so-called ON-OFF key (OOK) scheme. As described further hereafter with reference to FIG. 3, the WUR frame comprises synchronization information, a receiver's address and other transmission information. A WUR Wake-Up frame is a particular type of WUR frame which is used to wake up the PCR module of the non-AP station. Such a WUR Wake-Up frame 180 is received by the WUR 124 of the non-AP station 120. This latter, after checking that the WUR Wake-Up frame 180 is for its attention, generates a Wake-Up signal 185 for the attention of the PCR 122 to wake up it. At this instant, the PCR 122 becomes ON, the WUR 124 may become OFF and a PCR transmission may be initiated between the PCR 112 of the AP 110 and the PCR 122 of the non-AP station 120.

In the following description, as the PCR is the main communication module, a non-AP station is said in doze mode when its PCR is OFF and awake when its PCR is ON.

Moreover, when the power management is activated between an AP and a non-AP station, a non-AP station is either in active mode or in Power Saving (PS) mode. In active mode, the non-AP station may receive and transmit frames at any time. In other words, the non-AP station is always awake. In PS mode, the non-AP station is awake only when frames have to be received or transmitted. The non-AP station is thus in doze mode otherwise. Nevertheless, in doze mode, a non-AP station may wake up periodically to listen to beacon frames (sent by the AP) which may comprise a Traffic indication map (TIM) indicating that it is necessary for the station to enter in an awake state. Moreover, in doze mode, a non-AP station is able to send dedicated frames (PS-Poll) to the AP in order to enter latter in an awake state (to transmit data). Consequently, at any time, an AP may know the state of a non-AP station (i.e. whether a non-AP station is in doze mode or awake).

Figure 2:
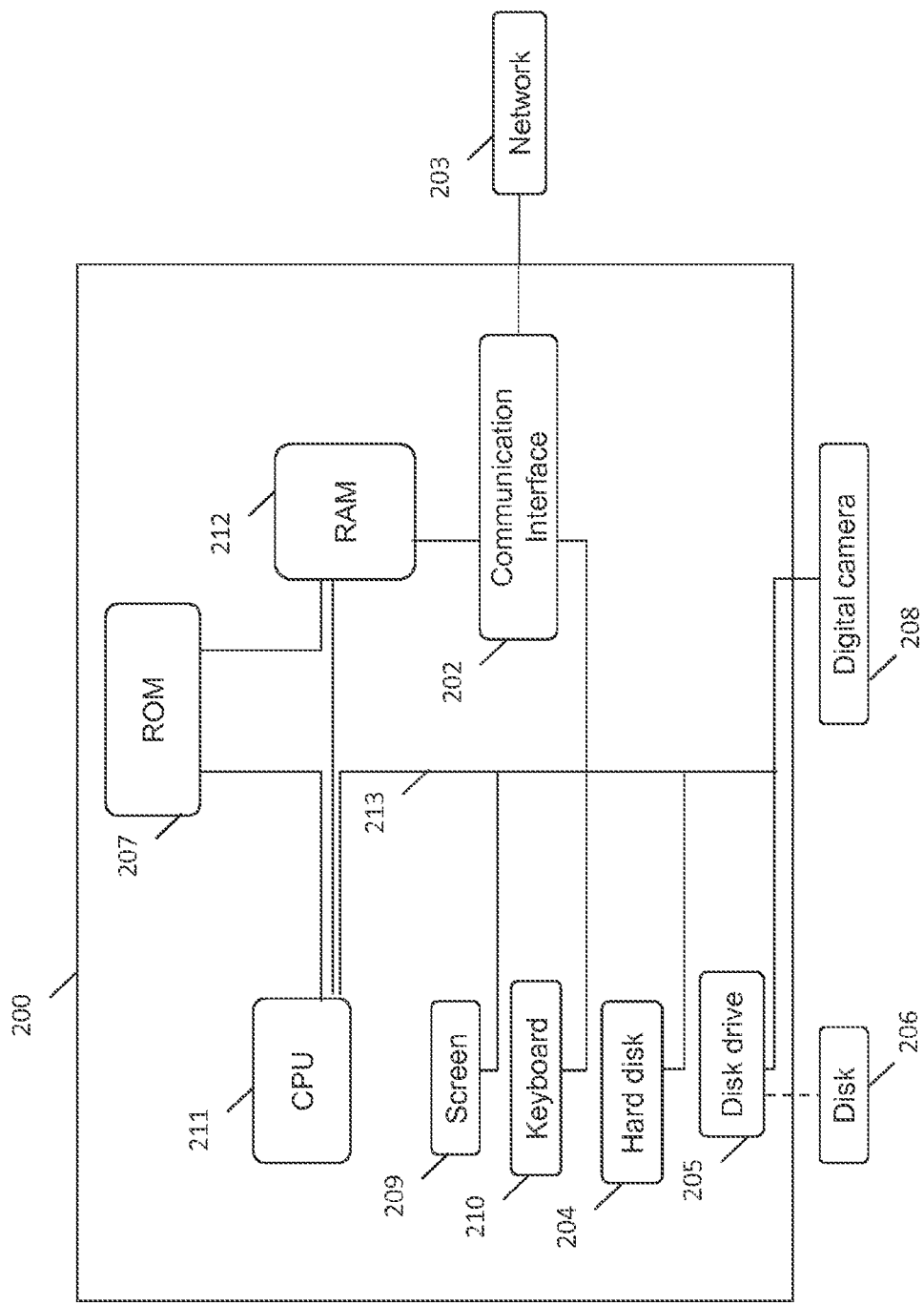
FIG. 2 is a block diagram showing an exemplary architecture of a communication device 200 according to embodiments of the present invention.

FIG. 2 is a block diagram showing an exemplary architecture of a communication device 200 according to embodiments of the present invention. For instance, the communication devices 200 may correspond to the Access Point 110 or to the non-AP station 120/130 of the communication system 100 shown in FIG. 1.

For illustration purposes only, the communication device 200 may be a vehicle, a home appliance or another embedded item with electronics, software, sensors and connectivity enabling objects to connect and exchange data. More specifically, it is well adapted for device referred to as Internet of Things (IoT) devices that are battery powered and require low-power operation and communication.

In this example, the communication device 200 comprises a communication bus 213 to which there are preferably connected:
- a central processing unit 211, such as a microprocessor, denoted CPU;
- a read only memory 207, denoted ROM, for storing computer programs for implementing the invention;
- a random access memory 212, denoted RAM, for storing the executable code of methods according to embodiments of the invention as well as the registers adapted to record variables and parameters necessary for implementing methods according to embodiments of the invention; more specifically, the RAM 212 may store a list of predetermined WUR identifiers hash functions, each one being characterized by a hash identifier;
- at least one communication interface 202 including a PCR and a WUR. The frames are written from a FIFO sending memory in the RAM 212 to the network interface for transmission or, they are read from the network interface for reception and written into a FIFO receiving memory in the RAM 212 under the control of a software application running in the CPU 211.

Optionally, the communication device 200 may also include the following components:
- a data storage means 204 such as a hard disk, for storing computer programs for implementing methods according to one or more embodiments of the invention;
- a disk drive 205 for a disk 206, the disk drive being adapted to read data from the disk 606 or to write data onto said disk;
- a screen 209 for displaying decoded data and/or serving as a graphical interface with a user, by means of a keyboard 210 or any other pointing means.

The communication device 200 may be optionally connected to various peripherals, such as for example a digital camera 208, each being connected to an input/output card (not shown) so as to supply data to the communication device 200.

Preferably the communication bus provides communication and interoperability between the various elements included in the communication device 200 or connected to it. The representation of the bus is not limiting and in particular the central processing unit is operable to communicate instructions to any element of the communication device 200 directly or by means of another element of the communication device 200.

The disk 206 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in the read only memory 207, on the hard disk 204 or on a removable digital medium such as for example the disk 206 described previously. According to an optional variant, the executable code of the programs can be received by means of the communication network 203, via the interface 202, in order to be stored in one of the storage means of the communication device 600, such as the hard disk 204, before being executed.

The central processing unit 211 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then comprises the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 3:
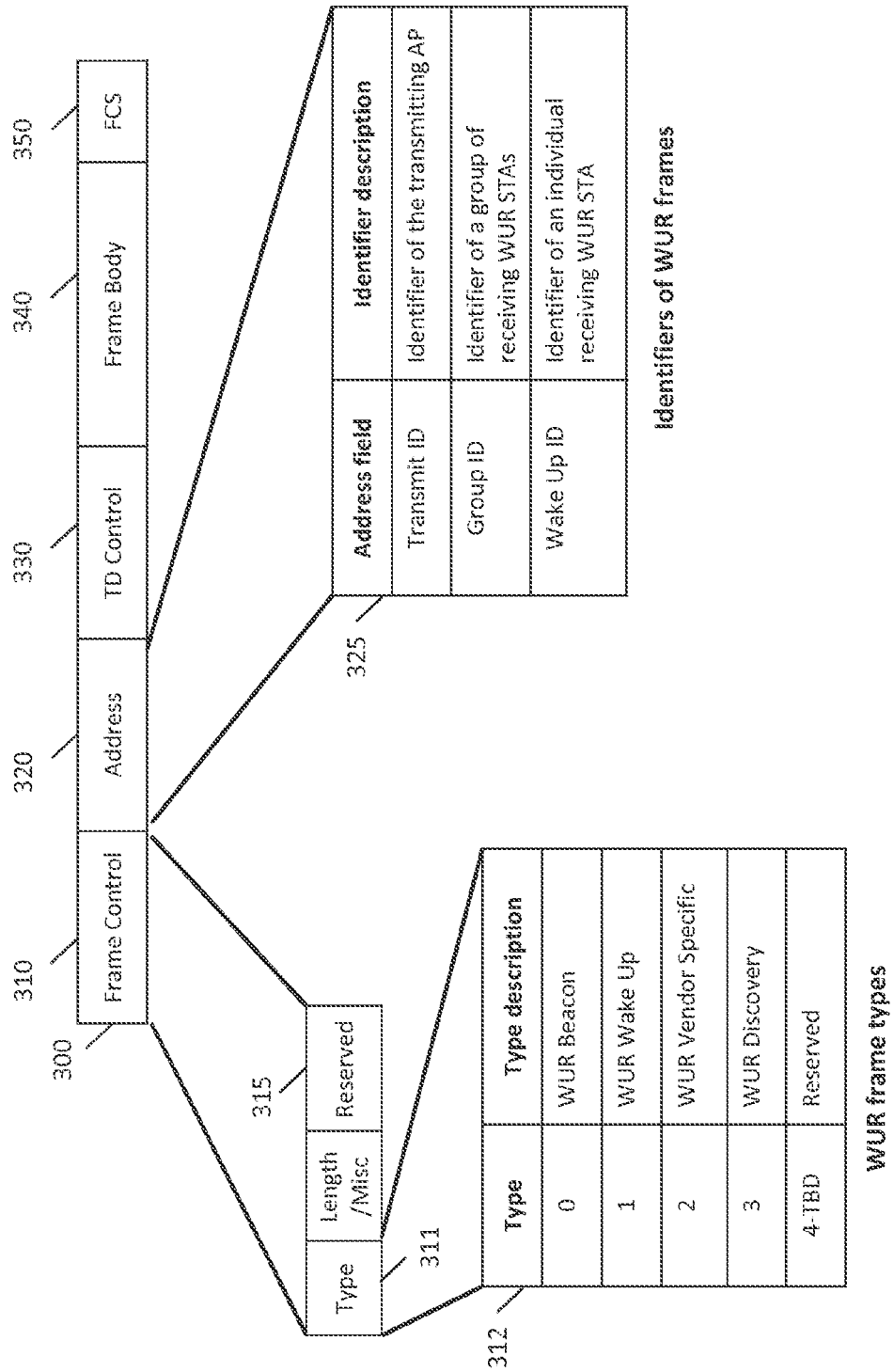
FIG. 3 shows the format of a Wake-Up Radio (WUR) frame 300 as defined in the IEEE 802.11ba standard.

FIG. 3 shows the format of a Wake-Up Radio (WUR) frame 300 as defined in the IEEE 802.11ba standard.

The WUR frame 300 comprises a "Frame Control" field 310, an "Address" field 320, a "TD Control" field 330, a "Frame Body" field 340 and a "FCS" field 350. "FCS" is for Frame Check Sequence. It is for instance a so-called CRC.

The fields 310, 320 and 330 form the MAC header of the WUR frame. The MAC header and "FCS" field 350 form the minimal WUR frame format and are present in all WUR frames.

The "Frame Control" field 310 comprises a "Type" subfield 311 and a "Reserved" subfield 315. The "Type" subfield 311 indicates the type of the WUR frame, referred to as WUR frame type. It is coded on 3 or 4 bits. Four WUR frame types are defined and listed in the table 312: "WUR Beacon" coded by value 0, "WUR Wake-Up" coded by value 1, "WUR Vendor Specific" coded by value 2 and "WUR Discovery" coded by value 3.

The "Address" field 320 comprises an identifier for the WUR frame, referred to as a WUR identifier. It is coded on 12 bits. Three WUR identifiers are defined and listed in the table 325: "Transmit ID", "Group ID", and "Wake-Up ID". "Transmit ID" corresponds to an identifier of the transmitting AP so that a frame including such a Transmit ID is for the attention of all the stations controlled by the identified AP. "Group ID" corresponds to an identifier of a group of non-AP stations. "Wake-Up ID" corresponds to an Identifier of a given (targeted) non-AP station.

The "Frame Body" field 340 is a variable-length field that comprises information specific to specific individual WUR frame types.

The "FCS" field 350 may comprise a Cyclic Redundancy Check (CRC). The size of CRC may be CRC-8, CRC-16 or CRC-32. The FCS is calculated over at least some or all the fields of the WUR frame, e.g., the "Frame Control" field 310, the "Address" field 320, the "TD Control" field 330, the "Frame Body" field (if present) 340, and also a BSSID value. These fields are referred to as the calculation fields. The BSSID value is part of the calculation but it is not included in the WUR frame transmitted over the wireless medium.

The format of each WUR frame inherits from its general WUR frame format and according to its WUR frame type, some fields are present or not.

Hence, the frame format of a WUR Beacon frame may comprise all fields but the "Frame Body" field 340. For this frame, the "Type" subfield 311 of the "Frame Control" field 310 is set to 0, and the "Address" field 320 may comprise the "Transmit ID".

As another example, the frame format of the WUR Wake-Up frame may comprise all fields. For such a frame, the "Type" subfield 311 of the "Frame Control" field 310 is set to 1, the "Address" field 320 comprises the "Wake-Up ID" of the targeted non-AP station when the WUR frame is individually addressed, the "Group ID" when the WUR frame is addressed to a group of stations, the "Transmit ID" when the WUR frame is broadcast and 0 when multiple "Wake-Up ID" are included in the frame body of the WUR frame 340.

Figure 4:
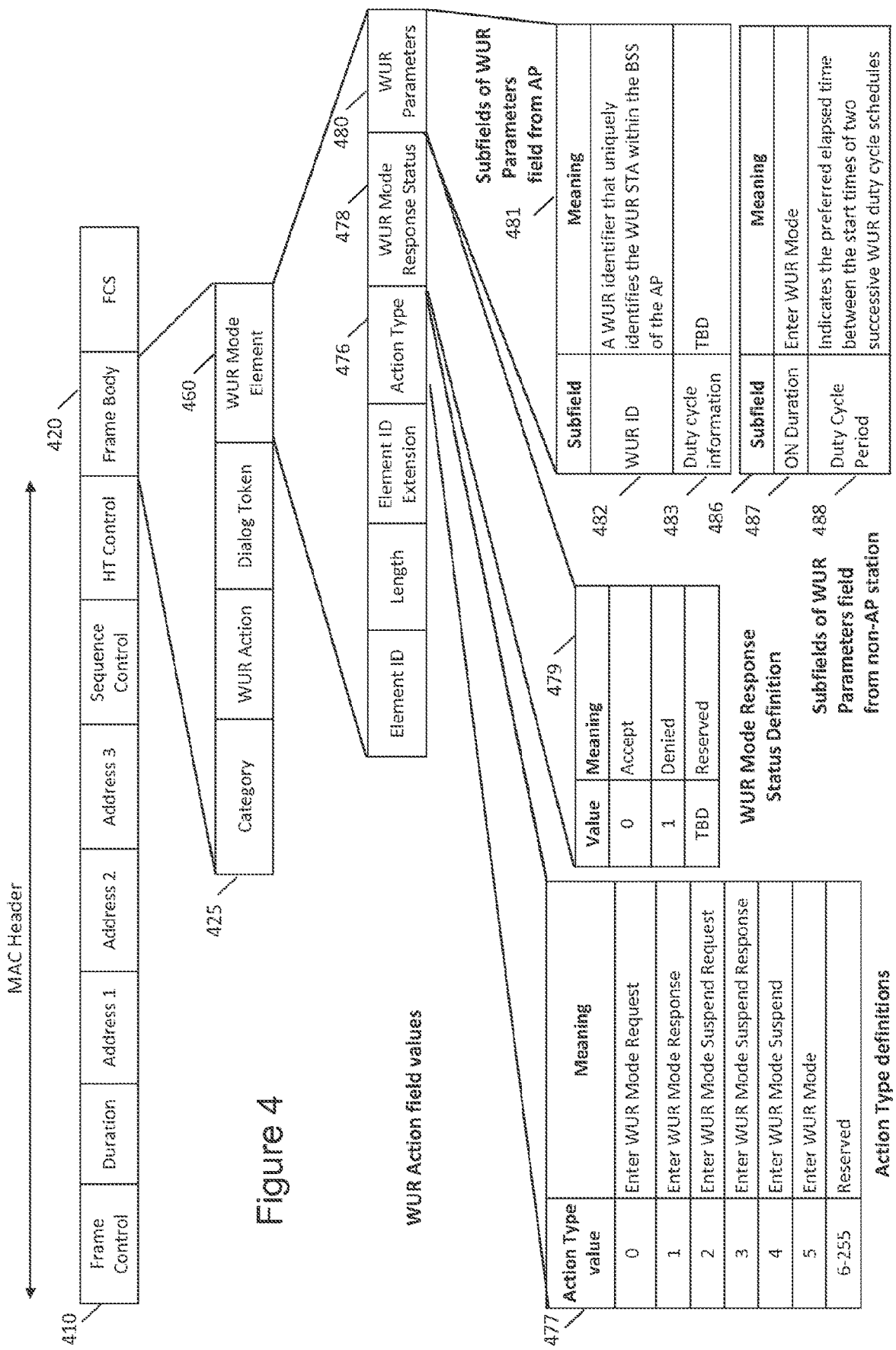
FIG. 4 shows the format of an 802.11 MAC Action frame including a WUR Action field as defined in the IEEE 802.11ba standard.

FIG. 4 shows the format of an 802.11 MAC Action frame including a WUR Action field as defined in the IEEE 802.11ba standard. In such a case, the frame is referred to as WUR Action frame. It is recalled that an 802.11 MAC Action frame is a management frame used to trigger an action. A WUR Action frame is used to negotiate the parameters related to WUR operations in the primary connectivity radio.

The WUR Action frame 410 comprises an "Action" field 425 (referred to as WUR Action field) in its "Frame Body" field 420.

The "Action" field 425 comprises a "WUR Mode Element" field 460 that is used to negotiate the parameters related to WUR operations. It comprises an "Action Type" field 476, a "WUR Mode Response Status" field 478 and a "WUR Parameters" field 480.

The "Action Type" field 476 comprises a number that identifies the type of WUR mode operation. It may be coded on 8 bits. Six types of WUR mode operations are defined and listed in table 477: "Enter WUR Mode Request" coded by value 0, "Enter WUR Mode Response" coded by value 1, "Enter WUR Mode Suspend Request" coded by value 2, "Enter WUR Mode Suspend Response" coded by value 3, "Enter WUR Mode Suspend" coded by value 4 and "Enter WUR Mode" coded by value 5. The values between 6 and 255 are reserved.

The "WUR Mode Response Status" field 478 indicates the status returned by the AP responding to the non-AP STA's WUR Mode request operation. This field is valid only when the "Action Type" field 476 is set to "Enter WUR Mode Response" or "Enter WUR Mode Suspend Response" and is reserved otherwise. Two status are defined: "Accept" coded by value 0 and "Denied" coded by value 1.

The "WUR Parameters" field 480 comprises several subfields. If the WUR Action frame 410 is sent from the WUR module of the AP, it comprises a list of subfields 481 including a "WUR ID" subfield 482 and a "Duty Cycle Information" subfield 483. The "WUR ID" subfield 482 corresponds to the WUR identifier that uniquely identifies a station within the BSS managed by the AP, referred to as Wake-Up ID. If the WUR Action frame is sent from the WUR module of a non-AP station, it comprises a list of subfields 486 including an "ON Duration" subfield 487 and a "Duty Cycle Period" subfield 488. The duty cycle corresponds to the period for which the WUR of a non-AP station is able to receive WUR frames when it is ON.

FIG. 5 including FIGS. 5a, 5b and 5c, shows fields/subfields/values added to the WUR frame and 802.11 MAC Action frame (including a WUR Action field) formats shown in FIGS. 3 and 4, according to embodiments of the invention.

FIG. 5a represents a table 512 listing the WUR frame types according to embodiments of the invention. In addition to the current version of IEEE 802.11ba (illustrated by the table 312), a first new WUR frame type referred to as "WUR Broadcast Identifiers modification" is defined and coded by value 4 and a second new WUR frame type referred to as "WUR Unicast Identifiers modification" is defined and coded by value 5. Obviously, other code values can be used.

FIG. 5b represents a table 577 listing the types of WUR mode operation according to embodiments of the invention. In addition to the current version of the IEEE 802.11ba (illustrated by the table 477), five new types of WUR mode operation are defined: "WUR identifiers collision identification" coded by value 6, "Wake Up ID collision identification" coded by value 7, "Transmit ID collision identification" coded by value 8, "Group ID collision identification" coded by value 9, and "WUR identifiers collision identification response" coded by value 10. Obviously, only certain of these values could be used and other values can be used.

FIG. 5c represents a list of subfields 581 included in a "WUR Parameters" field 480 of a "WUR Mode Element" of a WUR action frame 410. In addition to the current version of the IEEE 802.11ba, a first new subfield "Transmit ID" 584 is defined corresponding to a new Transmit ID to be applied (by the non-AP stations), a second new subfield "Hash Identifier" 585 is defined corresponding to a new identifier of a predetermined WUR identifiers hash function to be applied (by the non-AP stations), a third new subfield "Wake-Up ID" 586 is defined corresponding to a new Wake-up ID to be applied (by the intended non-AP station), and a fourth new subfield "Group ID" 587 is defined corresponding to a new Group ID to be applied (by the targeted non-AP stations).

FIG. 6 including FIGS. 6a and 6b, illustrates, using flowcharts, steps of communication methods during which broadcast update information is signaled by an AP to the non-AP stations of its network cell according to embodiments of the invention.

A key advantage of these embodiments is that the broadcast update information is received by all non-AP station regardless of they are in doze mode or awake. In particular, when the update information concerns the PCR module, it is not necessary to wait for the Wake-Up of all non-AP stations to take the updated information into account. Similarly, when the update information concerns the WUR module, it is not necessary to wait for the sleeping of all non-AP stations to take the updated information into account.

Within the wireless communication system 100, some non-AP stations are awake and others are in doze mode. When a non-AP station is in doze mode, it is not able to receive PCR frames but it is able to receive WUR frames from the AP. When a non-AP station is not in doze mode, i.e. it is awake, it is able to receive PCR frames and in some cases, it may be able to receive WUR frames.

According to a first embodiment shown in FIG. 6*a*, the AP wakes up all non-AP stations in doze mode using its WUR module and sends a broadcast update information through its PCR module (inside a PCR frame).

At step 600, the AP detects an event indicating that an update information needs to be sent to non-AP stations of its network cell.

Such an event may be triggered by a modification of the network conditions, e.g., a degradation of the QoS, which may depend on environmental factors (e.g., weather conditions), the presence of physical objects, electrical and/or radio frequency interferences, or the arrival/exit of a non-AP station in the network cell.

Such an event may also be triggered by the detection of a network configuration problem, as the addressing of the non-AP stations. This event may happen particularly in the context of high-density when a non-AP station enters a network cell. In such a context, in order to manage all non-AP stations, the AP may need to update the configuration of non-AP stations of its network cell.

In a variant, these steps may be performed at detection of other events, for instance:
Reception of a user request to update information;
Reception of a message from a non-AP station, for instance indicating that a WUR identifiers collision occurred.

In a variant, these steps may be performed regularly, e.g., the AP regularly sends an update information in order to ensure that all stations use the same values of parameters.

Next, at step 610, the AP generates a broadcast WUR Wake-Up frame as described with reference to FIG. 3. More specifically, the Type subfield 311 of its Frame control field 310 is set to 1, and its Address field 320 is set to its Transmit ID.

Next, at step 620, the AP sends the Broadcast WUR Wake-Up frame generated at step 610 through the WUR module. On one hand, this broadcast WUR Wake-Up frame will be ignored by the awake non-AP stations. On the other hand, this broadcast WUR Wake-Up frame will Wake-Up all stations in doze mode. All non-AP stations of the wireless communication system 100 are awake at the end of this step.

At step 630, the AP generates a Broadcast PCR frame including the broadcast update information (to be sent).

At step 640, the AP sends the Broadcast PCR frame generated at step 630 through its PCR module. It can be received by all the non-AP stations as they are all awake.

According to a second embodiment shown in FIG. 6*b*, the AP sends the broadcast update information separately through its PCR and WUR modules.

First, at step 660, the AP generates a broadcast WUR frame including the broadcast update information.

At step 670, the AP sends the broadcast WUR frame generated at step 660 through its WUR. This broadcast WUR frame (and consequently the broadcast update information) can be received by all non-AP stations in doze mode and ignored by the others (excepted if the WUR is always ON in the non-AP station). Next, steps 630 and 640 of FIG. 6*a* are performed, so that the broadcast PCR frame (and consequently the broadcast update information) can be received by all awake non-AP stations and ignored by the others.

The order of the steps can be different. In a variant, the order may be the following: step 630, step 640, step 660 and next step 670.

Moreover, in case of the WUR module of the non-AP station is always ON, steps 680 and 690 are not necessary.

According to an embodiment, the broadcast update information indicates a new value for a given WUR parameter applicable for all non-AP stations using their WUR module. For instance, it may concern a parameter necessary to support a WUR operation such as the Minimum Wake-Up Duration, the Duty Cycle Period Units (i.e. period for which the WUR non-AP station is able to receive WUR frames when WUR is ON), the WUR Operating Class (a WUR operating class corresponds to all available frequency bands and channels that can be used for transmission of WUR frame from the WUR AP to the WUR non-AP STA), the WUR Channel or the WUR Beacon. Such an update may be necessary when the WUR environment changes, such as the number of associated non-AP stations (which changes over time) or/and the wireless environment (more or less noisy). Moreover, it may concern a modification of the WUR identifiers as described with reference to FIG. 7.

According to another embodiment, the broadcast update information indicates a new value for a given WLAN parameter necessary for all non-AP stations. For instance, the AP may change its width of the High Throughput operation channel or/and its channel frequency or/and its ack policy or/and QoS parameters, depending on the number of associated non-AP stations (which changes over time) or/and the wireless environment (more or less noisy) or/and the traffic (data rate, Qos type, uplink/downlink).

In an embodiment, the WUR module and the 802.11ax modules are using a same channel. In that case, if a WUR action frame requesting an update of parameters such as 'operating class' or 'channel parameters' is sent by the PCR (e.g., through 802.11 network), the AP will also have to send this update at the WUR module of each non-AP station.

FIG. 7 including FIGS. 7*a* and 7*b*, illustrates, using flowcharts, steps of communication methods during which a WUR identifier modification is signaled by an AP to the non-AP stations of its network cell according to embodiments of the invention.

In these embodiments, a new value of the Transmit ID is required.

In these embodiments, the broadcast update information concerns the modification of the WUR identifiers of the non-AP stations.

It is recalled that within the wireless communication system 100, some non-AP stations are awake and others are in doze mode. When a non-AP station is in doze mode, it is not able to receive PCR frames but it is able to receive WUR frames from AP. When a non-AP station is not in doze mode, i.e. it is awake, it is able to receive PCR frames and in some cases, it may be able to receive WUR frames.

According to a first embodiment shown in FIG. 7*a*, the AP wakes up all non-AP stations in doze mode through its WUR module and sends them a WUR identifier modification information through its PCR module (inside a PCR frame).

At step 700, the AP receives a message indicating that a collision occurred and that a WUR identifiers modification may be necessary, the AP may select a new WUR identifier (for instance a new Transmit ID) and signal it to all its stations. This in this case, the event detected at step 600 is the reception of the message indicating the collision.

In another embodiment, the algorithm here described may be launched when the AP receives an unexpected PCR frame. Such a case may occur when a non-AP station receives a Wake-Up WUR frame and processes it by error. For instance, it may happen when the Wake-Up WUR frame comprises some erroneous bits and nevertheless, its address field (read at step 610 of FIG. 6) corresponds to the Transmit ID, group ID in which the non-AP station is registered, or the Wake-Up ID of the non-AP station and the received FCS corresponds to the computed FCS (output of step 640 is yes).

At step 705, the AP determines a WUR identifier modification information.

In an embodiment, the WUR identifier modification information is directly a new value of the Transmit ID. For instance, this new value can be selected randomly among a value range between 1 and 2047 excluding the Wake-Up ID of the non-AP stations already assigned by the AP.

In another embodiment, the WUR identifier modification information corresponds to an identifier of a hash function to be applied to compute the FCS. A WUR identifiers hash function is a function which may compute a value of Transmit ID on 12 bits from a BSSID coded on 48 bits. In this case, the hash function is a fingerprint function.

The AP and non-AP stations may store (in the random access memory 212) a predetermined list of WUR identifiers hash functions they can implement. For instance, a fingerprint function may be the 12 first (or last) bits of the BSSID of the AP. It may be also based on XOR. For instance, it may be equal to BSSID[0:11] XOR BSSID[12:23] XOR BSSID[24:35] XOR BSSID[36:47], BSSID[k,l] corresponding to the (l-k) bits of the BSSID of the AP between the $k^{th}$ bit and the $l^{th}$ bit. It may be equal to BSSID[24:35] XOR BSSID[36:47], BSSID[k,l] corresponding to the (l-k) bits of the BSSID of the AP between the $k^{th}$ bit and the $l^{th}$ bit.

One may note that the predetermined list of WUR identifiers hash functions is preferably the same between the AP and all non-AP stations. Similarly, the hash identifiers may correspond to the same WUR identifiers hash functions.

Next, at step 710, the AP generates a broadcast WUR Wake-Up frame as described with reference to FIG. 3. More specifically, the Type subfield 311 of its Frame control field 310 is set to 1, and its Address field 320 is set to its current Transmit ID. One should note that the Address field 320 is not set to the Transmit ID determined at step 705.

At step 720, the AP sends the Broadcast WUR Wake-Up frame generated at step 710 through the WUR module. On one hand, this broadcast WUR Wake-Up frame may be ignored by the awake non-AP station. On the other hand, this broadcast WUR Wake-Up frame may Wake-Up all stations in doze mode. Hence, all non-AP stations of the wireless communication system 100 are awake at the end of this step.

At step 730, the AP generates a Broadcast PCR frame including the broadcast update information (to be sent). To do so, the AP generates a WUR Action frame as described with reference to FIG. 4. Its Action Type field 476 is assigned according to the table 577 described with reference to FIG. 5 and is set to 10 corresponding to "WUR identifiers collision identification response". Moreover, the WUR Action frame comprises a WUR Parameters field 480 assigned according to the table 581.

According to embodiments of the invention, if WUR identifier modification information corresponds to a new value of a Transmit ID to be applied, the WUR Parameters field 480 comprises a subfield "Transmit ID" 584 corresponding to the value of the New Transmit ID to be applied.

According to embodiments of the invention, if WUR identifier modification information corresponds to a new value of a hash identifier to be applied, the WUR Parameters field 480 comprises a subfield "Hash Identifier" 584 corresponding to the value of the New Hash Identifier to be applied.

At step 740, the AP sends the Broadcast PCR frame generated at step 730 through the PCR module. It may be received by all non-AP stations of the BSS because they are all awake at the end of step 720. Each non-AP station will decode the Broadcast PCR frame.

According to some embodiments of the invention, if the WUR identifier modification information corresponds to a new value of a Transmit ID to be applied, it will store directly the new received Transmit ID which be applied from now by AP (for instance for transmitting broadcast Wake-Up frames).

According to other embodiments of the invention, if WUR identifier modification information corresponds to a new value of a hash identifier to be applied, it needs to recover the WUR identifiers hash function corresponding to the received hash identifier and computes the new Transmit ID to be applied from the BSSID and the recovered WUR identifiers hash function.

According to a second embodiment shown in FIG. 7b, the AP sends the broadcast update information separately through the PCR and WUR modules.

A key advantage of this second embodiment is that the multicast update information is received by all stations regardless of their states. In particular, it is not necessary for a given non-AP station to wait for its Wake-Up for receiving the multicast update information. In other words, in case a non-AP station is in doze mode while receiving the update information, it will process it when it will Wake-Up. A further exchange of messages is not necessary once the non-AP station is awake.

Steps 700, 705, 730 and 790 are the same as in the first embodiment of FIG. 7a.

After step 705, the AP generates a broadcast WUR frame at step 760 that includes the WUR identifier modification information.

In a first example, the broadcast WUR frame corresponds to a WUR beacon frame with a dedicated 1-bit field included in the Frame Control field 310 to indicate that the beacon frame corresponds also to WUR identifier modification information. More specifically, the dedicated 1-bit field may be included in the Reserved field 315 of the Frame Control field 310. According to a first implementation, the WUR identifier modification information may be comprised in the Reserved field 315 of the Frame Control field 310. According to a second implementation, the WUR identifier modification information may be comprised in the payload field 340 of the WUR beacon frame.

In a second example, the broadcast WUR frame corresponds to a new type of WUR frame. More precisely, the Type subfield 311 of its Frame control field 310 is assigned according to the table 512 and is set to value 4 corresponding to a "WUR Broadcast Identifiers modification". Moreover, its Address field 320 is set to its current Transmit ID. One should note that the Address field 320 is not set to the Transmit ID determined at step 705. The WUR identifier modification information is comprised in the payload field 340 of the broadcast WUR frame.

At step 770, the AP sends the broadcast WUR frame generated at step 760 through the WUR module. This broadcast WUR frame (and consequently the broadcast update information) may be received by all non-AP stations in doze mode and ignored by the others excepted by non-AP station which WUR module is always ON.

Next, the steps 730 and 740 of FIG. 7a are performed.

The order of the steps can be different. For example, the order of steps may be the following: step 705, 730, step 740, step 760 and next step 770.

Moreover, in case of the WUR module of the non-AP station is always ON, steps 730 and 740 are not necessary.

FIG. 8 illustrates, using a flowchart, steps of a communication method during which update information is signaled by an AP to a given non-AP station according to embodiments of the invention.

A key advantage of these embodiments is that the unicast update information is received regardless of the non-AP station is in doze mode or awake. In particular, it is not necessary for a non-AP station to wait for its wake-up for receiving the unicast update information.

At step 800, the AP detects an event indicating that an update information needs to be sent to a given non-AP station of its network cell.

Such an event may be triggered by a modification of the network conditions, e.g., a degradation of the QoS, which may depend on environmental factors (e.g., weather conditions), the presence of physical objects, electrical and/or radio frequency interferences, the arrival/exit of a non-AP station in the network cell, or the distance increase between the AP and the given non-AP station.

Such an event may also be triggered by the detection of a network configuration problem, such as the addressing of the given non-AP station.

In a variant, these steps may be performed at detection of other events, for instance:

Reception of a user request to update information;

Reception of a message from a non-AP station, for instance indicating that a WUR identifiers collision occurred.

In a variant, these steps may be performed regularly, e.g., the AP regularly sends an update information in order to ensure that all stations use the same values of parameters.

Next, at step 810, the AP determines the state of a non-AP station (hereafter referred to as the targeted non-AP station): either in doze mode or awake.

If the targeted non-AP station is awake (output of 820 is yes), the next step is 850. If not, the next step is 830.

At step 830, the AP generates a unicast WUR frame including the unicast update information. Next, at step 840, the AP sends the unicast WUR frame through its WUR module which can be received by the targeted non-AP station because its WUR is ON.

At step 850, the AP generates a unicast PCR frame including the unicast update information. Next, at step 860, the AP sends the unicast PCR frame through its PCR module which can be received by the targeted non-AP station because its PCR is ON.

Moreover, in case of the WUR module of the non-AP station is always ON, only the steps 830 and 840 may be implemented.

According to an embodiment, the unicast update information may indicate a new value for a given WUR parameter necessary for a specific non-AP station using its WUR module. For instance, duty cycle (period for which the WUR non-AP station is able to receive WUR frames when WUR is ON) parameters as the starting point, the ON duration and duty cycle duration.

According to another embodiment, the unicast update information may indicate a new value for a given WLAN parameter necessary for all non-AP stations. It can be relevant in order to advantage or penalize a specific non-AP station by modifying for instance its QoS parameters (EDCA parameters). Moreover according to the wireless environment (more or less noisy), some parameters as modulation and coding scheme can be modified in order to adapt and reliable very quickly the transmission in order to receive/transmit data.

Moreover, it may concern a modification of the WUR identifiers as Wake-Up ID as described with reference to FIG. 9.

According to another embodiment, the unicast update information indicates a new value for a given WLAN parameter of a specific non-AP station. For instance, it may concern any parameters defined in 802.11 for supporting a transmission such as the Modulation and Coding Scheme (MCS), the RTS Threshold, the Short Retry Limit, the OCWmin, or the Number of trigger frames per TBTT.

Figure 8A:
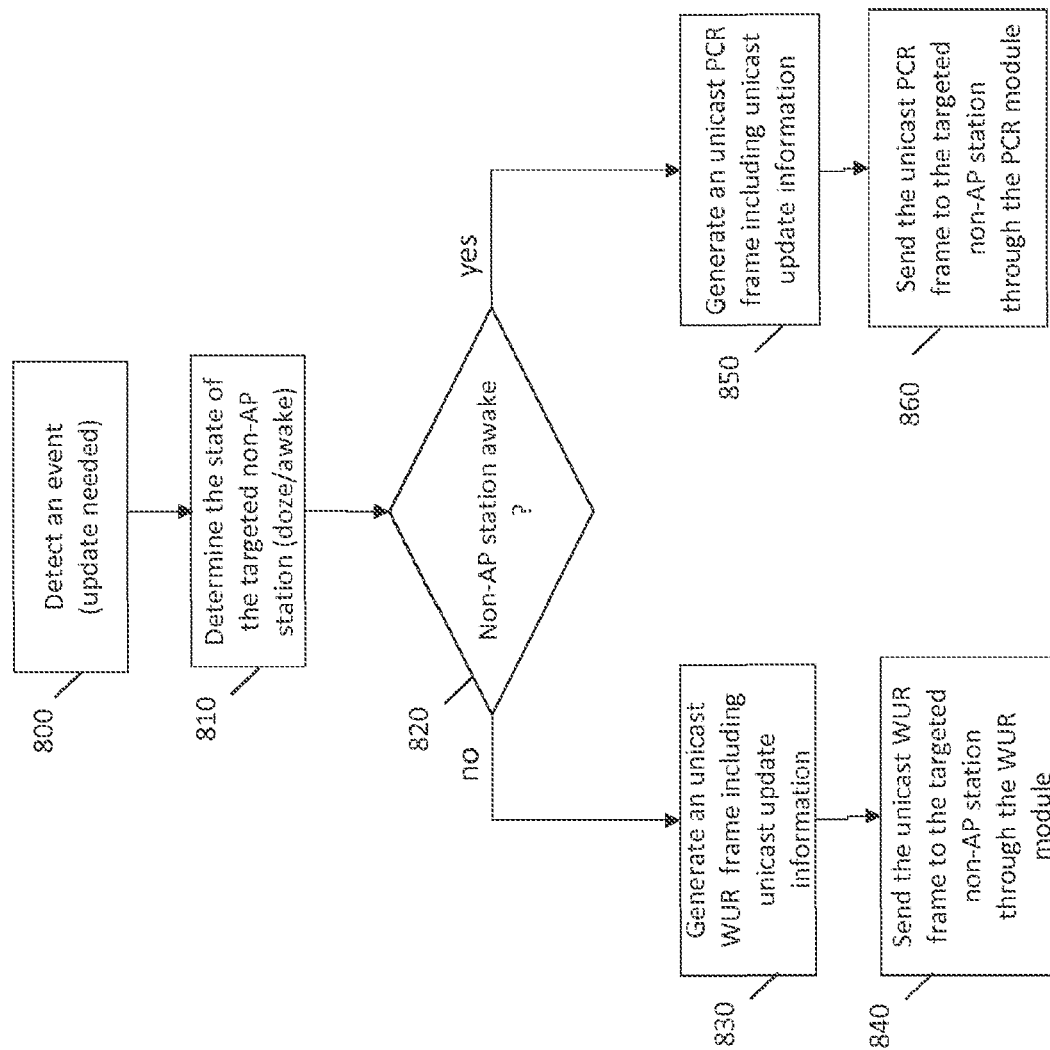
FIG. 8a illustrates, using a flowchart, steps of a communication method during which update information is signaled by an AP to a given non-AP station according to embodiments of the invention.
Figure 8B:
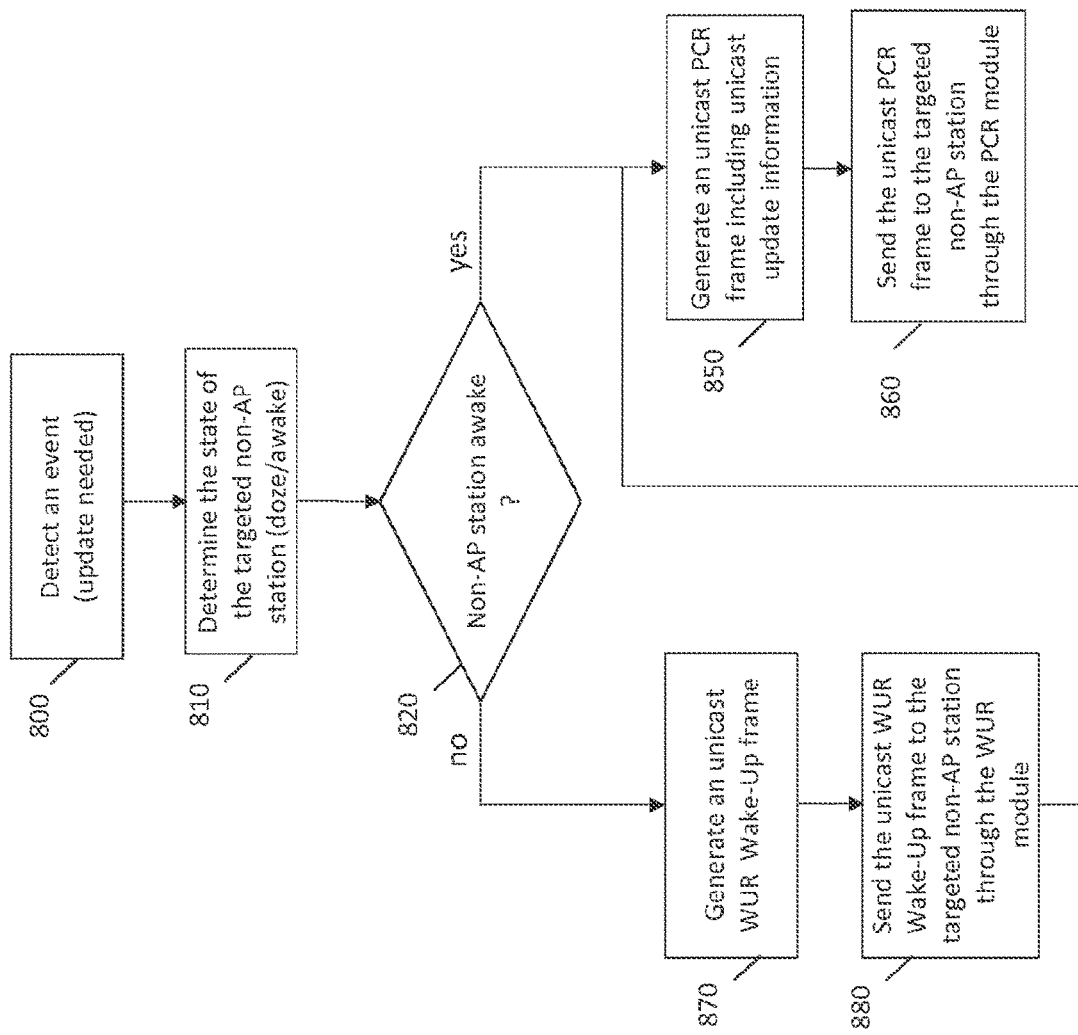

FIG. 8b illustrates, using a flowchart, steps of a communication method during which update information is signaled by an AP to a given non-AP station according to a variant of FIG. 8a.

According to this variant, if it is determined that the targeted non-AP station is not awake at step 820, the AP generates a unicast WUR Wake-Up frame (Type subfield 311 of its Frame control field 310 set to 1 and Address field 320 set to Wake-Up ID of the non-AP station) at step 870.

Next, the AP sends the unicast WUR Wake-Up frame to the targeted non-AP station.

Steps 850 and 860 are then performed as described with reference to FIG. 8a.

This alternative may be particularly interesting when the AP does not know the state of the non-AP station.

Figure 9:
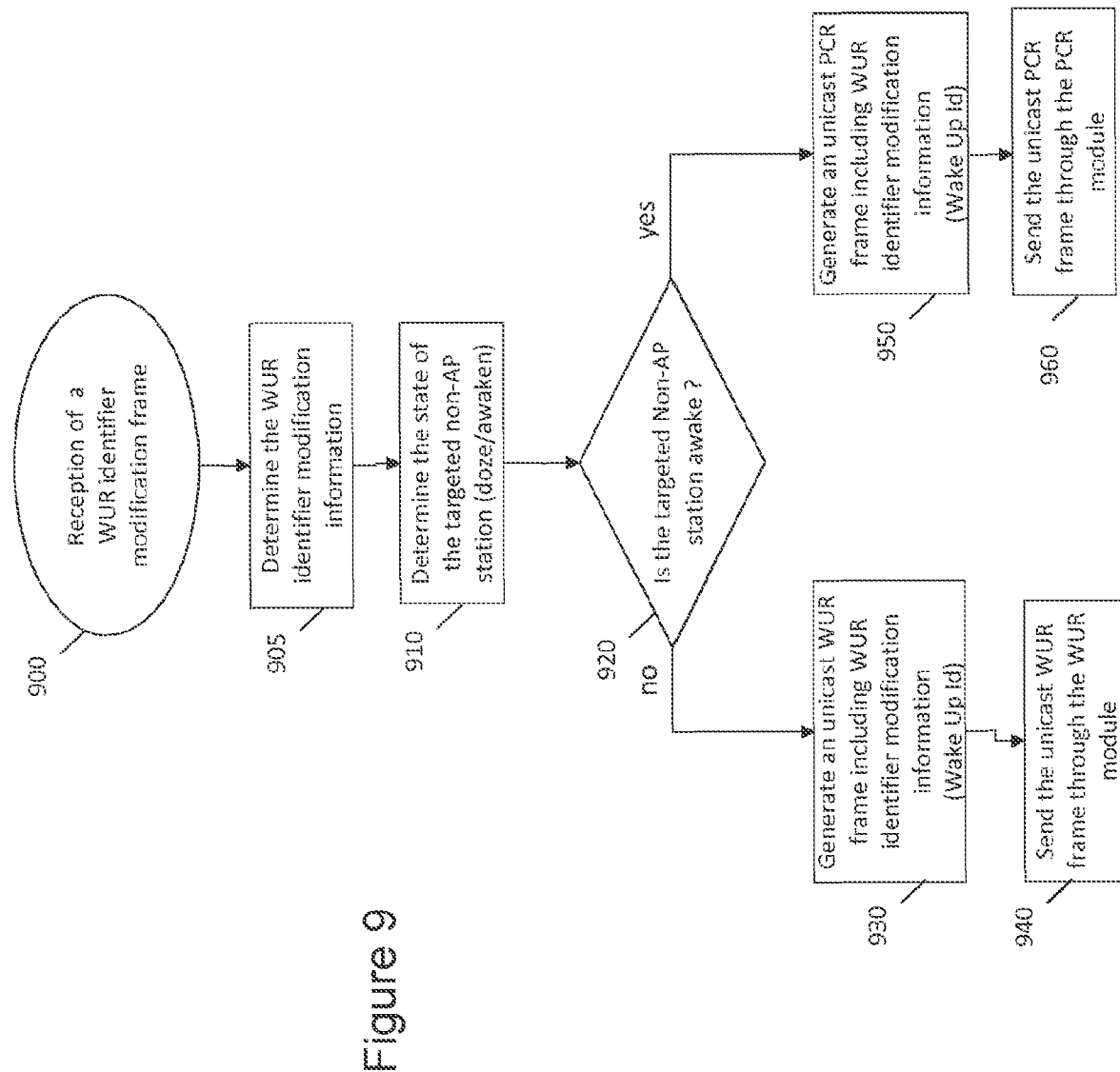
FIG. 9 illustrates, using a flowchart, steps of a communication method during which a WUR identifier (Wake-Up ID) modification is signaled by an AP to a given non-AP station according to embodiments of the invention.

FIG. 9 illustrates, using a flowchart, steps of a communication method during which a WUR identifier modification is signaled by an AP to a given non-AP station according to embodiments of the invention. In these embodiments, a new value of the Wake-Up ID is required by the non-AP station.

In these embodiments, the update information concerns the modification of the WUR identifier of the non-AP station.

At a first step 900, the AP receives a frame from a non-AP station (hereafter referred to as the targeted non-AP station) indicating that a collision between WUR identifiers occurred.

In another embodiment of the invention, the algorithm here described may be launched when the AP receives an unexpected PCR frame. Such a case may occur when a non-AP station receives a Wake-Up WUR frame and processes it by error. For instance, it may happen when the Wake-Up WUR frame comprises some erroneous bits and nevertheless, its address field (read at step 610 of FIG. 6) corresponds to the Transmit ID or Group ID in which the non-AP station is registered, or the Wake-Up ID of the non-AP station and the received FCS corresponds to the computed FCS (output of step 640 is yes).

At step 905, the AP determines the WUR identifier modification information. In this example, the WUR identifier modification information is directly a new value of the Wake-Up ID. For instance, this new value can be selected randomly among a value range between 1 and 2047 excluding the Wake-Up ID of the non-AP stations already assigned by the AP and the Transmit ID of the AP.

Next, at step 910, the AP determines the state of the targeted non-AP station: either in doze mode or awake.

If the targeted non-AP station is awake (output of 920 is yes), the next step is 950. If not, the next step is 930.

At step 930, the AP generates a unicast WUR frame including the WUR identifier modification information. The unicast WUR frame corresponds to a new type of WUR frame. More precisely the Type subfield 311 of its Frame control field 310 may be assigned according to the table 512 and may be set to value 5 corresponding to a "WUR Unicast Identifiers modification". Moreover, its Address field 320 may be set to its current Wake-Up ID and not the Wake-Up ID determined at step 905. The WUR identifier modification information may be comprised in the payload field 340 of the unicast WUR frame.

At next step 940, the AP sends the generated unicast WUR frame through the WUR module and this frame may be received by the targeted non-AP station because its WUR is ON.

At step 950, the AP generates a unicast PCR frame including the WUR identifier modification information. To do so, the AP generates a WUR Action frame as described with reference to FIG. 4. Its Action Type field 476 may be assigned according to the table 577 described with reference to FIG. 5 and may be set to 10 corresponding to "WUR identifiers collision identification response". Moreover, the WUR Action frame may comprise a WUR Parameters field 480 assigned according to the table 581. According to embodiments of the invention, if WUR identifier modification information corresponds to a new value of a Wake-Up ID to be applied, the WUR Parameters field 480 may comprise a subfield "Wake-Up ID" 586 corresponding to the value of the Wake-Up ID to be applied.

At next step 960, the AP sends the generated unicast PCR frame through the PCR which may be received by the targeted non-AP station because its PCR is ON.

In the case of the WUR module of the non-AP station is always ON, only the steps 930 may be implemented.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless communication network comprising one or more stations managed by an access point, the communication method comprising, at the access point:
   detecting an event that is triggered by a change of network conditions of the wireless communication network; and
   transmitting, in response to the detection of the event, a Wake-Up radio (WUR) frame including update information, the WUR frame being transmitted to at least one station of the one or more stations.

2. The communication method according to claim 1, the communication method further comprising:
   transmitting, in response to the detection of the event, a main radio frame including said update information, the main radio frame being transmitted to at least one of the one or more stations,
   wherein the main radio frame is a frame defined in IEEE802.11 series standards.

3. The communication method according to claim 2, wherein the main radio is a primary connectivity radio (PCR).

4. The communication method according to claim 1, wherein the WUR frame is a frame defined in IEEE802.11ba standard.

5. The communication method according to claim 1, wherein the change the network conditions include at least one of a degradation of QoS, a presence of physical objects, a frequency interference, and an arrival or exit of another station.

6. A non-transitory computer-readable medium storing a program which, when executed by a microprocessor or computer system in a device, causes the device to perform the method of claim 1.

7. An access point in a wireless communication network comprising one or more stations managed by the access point, the access point comprising at least one microprocessor configured for carrying out the following steps:
   detecting an event that is triggered by a change of network conditions of the wireless communication network; and
   transmitting, in response to the detection of the event, a Wake-Up Radio (WUR) frame including update information, the WUR frame being transmitted to at least one station of the one or more stations.

8. A communication method in a wireless communication network comprising one or more stations managed by an access point, the communication method comprising, at the access point:
   detecting an event that is triggered by a change of network conditions of the wireless communication network; and
   transmitting, in response to the detection of the event, a radio frame including update information, the radio frame being transmitted to at least one station of the one or more stations,
   wherein the radio frame is received by the at least one station while the at least one station is in doze mode, and the at least one station is configured to wake up based on the received radio frame.

9. The communication method according to claim 8, wherein the radio frame is a Wake-Up radio (WUR) frame defined in IEEE802.11ba standard.

10. The communication method according to claim 8, wherein the change the network conditions include at least one of a degradation of QoS, a presence of physical objects, a frequency interference, and an arrival or exit of another station.

11. A non-transitory computer-readable medium storing a program which, when executed by a microprocessor or computer system in a device, causes the device to perform the method of claim 8.

12. An access point in a wireless communication network comprising one or more stations managed by the access point, the access point comprising at least one microprocessor configured for carrying out the following steps:
   detecting an event that is triggered by a change of network conditions of the wireless communication network; and
   transmitting, in response to the detection of the event, a radio frame including update information, the radio frame being transmitted to at least one station of the one or more stations, wherein the radio frame is received by the at least one station while the at least one station is in doze mode, and the at least one station is configured to wake up based on the received radio frame.

* * * * *